Patented Nov. 11, 1941

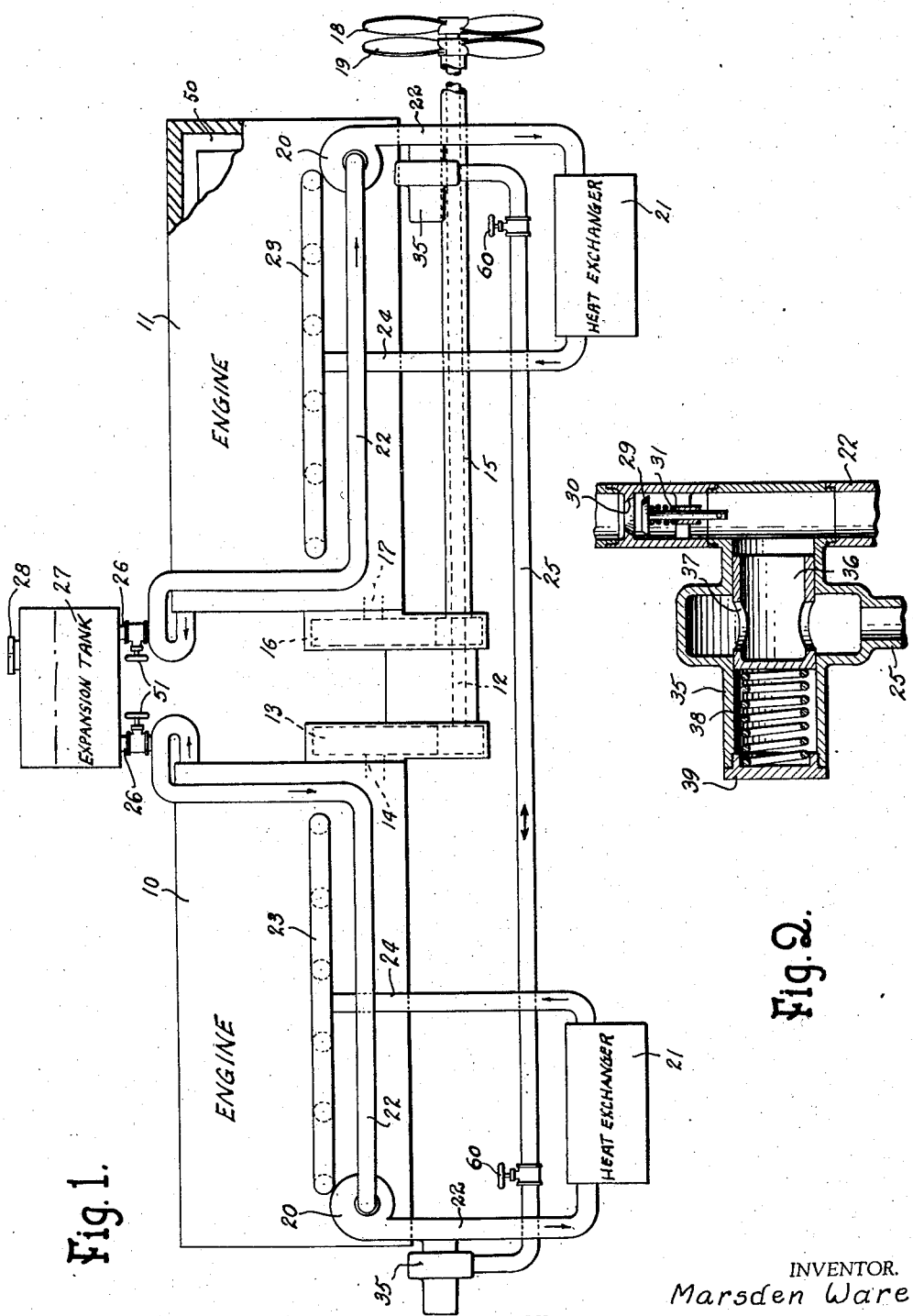

2,262,659

UNITED STATES PATENT OFFICE 2,262,659

INTERNAL COMBUSTION ENGINE

Marsden Ware, Huntington Woods, Mich., assignor to Packard Motor Car Company, Detroit, Mich., a corporation of Michigan Application November 8, 1939, Serial No. 303,343

9 Claims. (Cl. 60—97)

This invention relates to fluid heat transfer systems for internal combustion engines.

Power plants for boats and aircraft sometimes include two or more internal combustion engines for driving propellers and such engines are equipped with individual fluid cooling systems. Such systems when used with boats employ engine driven pumps for circulating water to absorb heat from the engine cooling fluid flowing through the radiator, and some form of thermostatically controlled shutter mechanism is usually employed with air-cooled radiators of fluid cooling systems used with aircraft engines. When one of the engines fails or is purposely stopped, the temperature of the fluid in the cooling system is reduced to such an extent that no thermal assistance is rendered thereby when the engine operation is renewed. Also when increased engine power is desired while idling, the power step-up is retarded by the time required to raise the temperature of the cooling fluid.

It is the purpose of this invention to assist the starting and/or power increase of an engine in a power plant of the type described by an interconnection of the heat transfer systems.

Another object of the invention is to provide inter-connected fluid heat transfer systems for a plurality of engines in a power plant with means that will automatically control the flow of heated fluid from one engine cooling system to another.

A further object of the invention is to assist the starting of a dead engine or to assist the the rate of engine power increase, in a power plant of the type referred to, by means whereby a portion of the heated cooling fluid flowing from an operating engine will be circulated through a portion of the cooling system of the dead engine.

Other objects of the invention will appear from the following description taken in connection with the drawing, which forms a part of this specification, and in which:

Fig. 1 is a diagrammatic elevational view of a power plant having the invention associated therewith;

Fig. 2 is a detailed vertical sectional view of one of the means for controlling flow from one cooling system to the other.

Referring now to the drawing, a power plant is illustrated as comprising two internal combustion engines 10 and 11 of conventional design. Engine 10 drives a propeller shaft 12 through means of suitable gearing 13 driven by the crankshaft 14 and engine 11 drives a propeller shaft 15 through means of suitable gearing 16 driven by the crankshaft 17. A propeller 18 is fixed on shaft 12 and a propeller 19 is fixed on shaft 15.

Each engine is provided with an individual fluid heat transfer system of conventional design. Each system includes an engine driven pump 20 and a heat exchanger or radiator 21. The engines are formed with the usual internal cooling fluid chambers 50 and conduits 22 connect the outlet end of the chambers with the radiators, the pumps 20 being arranged in such conduits. Inlet manifolds for distributing fluid to the chambers in the engine are indicated at 23 and conduits 24 lead thereto from the radiators. Thus the fluid in each system flows in a circuit consisting of a conduit 22, radiator 21, conduit 24, intake manifolds 23 and the chambers 50 in the engine.

It is the purpose of this invention to interconnect the cooling systems of the two engines so that heated fluid in one engine will be utilized to raise the temperature of the other to thus assist starting or power increase. To this end the systems are interconnected preferably by a conduit 25 somewhere between the pumps and the radiators. It is also desirable that room be allowed for fluid expansion and for this purpose the highest points of conduits 22 are connected by pipes 26 with a common expansion tank 27 having a vented closure cap 28. The conduits 22 are provided with one-way valves 29 normally urged toward their seats 30 by springs 31, these valves being arranged to prevent back flow of fluid into the pumps.

Fluid from the engine cooling system having the higher pressure will flow through conduit 25 to conduit 24 of the cooling system of the other engine where it will flow through the radiator and the fluid intake manifold to the internal chambers because the valve 29 will be closed. The fluid will flow from the chambers of the engine having the lower cooling fluid pressure and the conduit 22 connected therewith through the associated pipe 26 to the expansion tank. Fluid in the tank will flow back into conduit 22 of the higher cooling fluid pressure system through the associated connecting pipe 26. The heated fluid in the engine having higher cooling fluid pressure is thus by-passed through the other engine and will raise its temperature to thereby assist in starting or in the rate of power increase.

The cooling fluid circulating pumps are suitably driven by the engines and fluid flow in the cooling fluid systems varies with engine speed. It is desirable to regulate the flow through the connecting conduit 25 so that too much fluid will not be diverted from the one engine to the other and to regulate the fluid flow through the engine having the lower cooling fluid pressure. To these ends automatic flow control means is provided.

The connection between each conduit 22 and the connecting conduit 25 is in the form of a housing 35 having intersecting chambers in one of which is slidably mounted a piston valve 36. These valves have an open end communicating with the interior of the adjacent conduit 22 and they have radial ports 37 that open to the adjacent housing chamber leading to the conduit 25. Coil springs 38 normally exert pressure against the valves to hold the radial ports in wide open registration with the connecting conduit. Caps 39 can be adjusted to regulate the pressure exerted by the springs and the pressure against each valve is preferably similar or balanced so that the springs offer similar resistance to valve movement. Suitable stop means (not shown) can be employed to limit movement of the valves 36 toward conduits 22 beyond the position shown in Fig. 2.

When one engine has stopped operating, or when both engines are operating at different speeds, there is a pressure difference in the cooling systems so that fluid will flow through conduit 25 from the higher pressure system to the lower pressure system. Pressure in the cooling systems varies in accordance with engine speed and the valves 36 respond to such pressures to control the diversion of fluid from the higher pressure system when there is a difference in the fluid pressure in the cooling systems. The valves are mainly useful when one engine has stopped or is operating very slowly in comparison with the other engine because without restriction, diversion of fluid from the higher pressure system would be too great especially during higher engine speeds.

The system is also equipped with emergency control means in the event the automatic means fails or a further restriction through the interconnection is desired. Such means consists of hand actuated valves 60 in the conduit between the pressure valves and hand operated valves 51 in the pipes 26.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a power plant, the combination with circulatory fluid heat transfer systems for a pair of engines, of a connection between said systems for diverting a portion of the heated fluid in either system to the other system, and means controlling the flow of fluid through said connection.

2. In a power plant, the combination with fluid heat transfer systems for a pair of engines, of a connection between said systems, and pressure actuated valve means in said connection automatically regulating fluid flow therethrough.

3. In a heat transfer system, the combination with a pair of engine cooling fluid circuits each having a pump and a radiator, of a conduit connecting the circuits between the pumps and radiators, and a non-return valve means in the circuits between said conduit and said pumps.

4. In a heat transfer system, the combination with a pair of engine cooling fluid circuits, of means interconnecting said circuits through which fluid can flow from one circuit to the other, and means in said interconnecting means regulating the direction and rate of fluid flow therethrough.

5. In a heat transfer system for a pair of engines, a fluid cooling circuit for each engine including a radiator and a pump for moving the fluid through the radiator, a fluid connection between the circuits adjacent the outlets from the engines, an interconnection between the circuits between the radiators and the pumps, and a one-way valve in each circuit between the pump and the interconnection.

6. In a heat transfer system for a pair of engines, of fluid cooling circuit for each engine including a radiator and a pump for moving fluid through the radiator, an expansion chamber connecting the circuits adjacent the fluid outlet of the engines, a one-way valve in each circuit adjacent the pump, a connection for the circuits between the valves and the radiators, and balanced pressure operated valves in the connection.

7. In a heat transfer system for a pair of engines, a fluid cooling circuit for each engine including a radiator and a pump for moving fluid through the radiator, an expansion tank connecting the circuits adjacent the engine fluid outlets, valve means operable to shut off the tank from the circuits, a one-way valve in each system adjacent the pump outlets, means connecting the circuits between the one-way valves and the radiators, and valve means in the connecting means operable to shut off flow therethrough.

8. In a heat transfer system for a pair of engines, a fluid cooling circuit for each engine including a heat exchanger, an engine chamber and a pump intermediate the chamber and the heat exchanger; conduit means connecting the portions of the circuits between the pumps and the heat exchangers; and means operating automatically to control the quantity of fluid flow through the conduit means.

9. In a heat transfer system for a pair of engines, a fluid cooling circuit for each engine comprising an engine heat transfer chamber connected with a heat exchanger, conduit means interconnecting interior portions of said circuits, and pressure responsive means automatically regulating fluid flow through the interconnecting means so that the temperature of the fluid in the colder circuit will be raised.

MARSDEN WARE.